Patented Sept. 10, 1940

2,214,405

UNITED STATES PATENT OFFICE.

2,214,405

PLASTICIZED SYNTHETIC LINEAR POLYAMIDE COMPOSITION

Donald D. Coffman, Wilmington, Del., assignor to E. I. du Pont de Nemours & Company, Wilmington, Del., a corporation of Delaware No Drawing. Application July 25, 1938, Serial No. 221,261

11 Claims. (Cl. 260—33)

This invention relates to synthetic linear condensation polymers, and more particularly to plasticized compositions comprising these polymers.

A new class of fiber-forming materials known as synthetic linear condensation polymers ("superpolymers") is described in United States Patents 2,071,250–2,071,253. A characteristic property of these polymers is that they can be formed into filaments which can be cold drawn, that is drawn in the solid state, into fibers showing molecular orientation along the fiber axis. Of these polymers the polyamides are most useful for the preparation of fibers, bristles, ribbons, sheets, and the like. The polyamides are of two types, those derived from polymerizable monoaminomonocarboxylic acids and their amide-forming derivatives, and those derived from the reaction of suitable diamines with suitable dicarboxylic acids or amide-forming derivatives of dibasic carboxylic acids. It will be noted that the polyamides are derived from bifunctional amide-forming derivatives. On hydrolysis with mineral acids the polyamides revert to the bifunctional reactants from which they are derived. For example, a polyamide derived from a diamine and dibasic acid yields on hydrolysis with hydrochloric acid, the dibasic acid and the diamine hydrochloride.

Although the synthetic linear condensation polyamides as a class are microcrystalline and have fairly high and sharp melting points, they can be formed into many useful objects without the use of solvents or plasticizers. This is accomplished by spinning, extruding, or otherwise forming the object from the molten polyamide. To improve the properties of the products thus formed, it is generally desirable to subject them to a process of cold drawing (by application of tensile stress) or to a process of cold rolling (by application of compressive stress) or by subjecting them to both cold drawing and cold rolling. These processes of cold drawing and cold rolling to bring about orientation of the polyamide molecules will be referred to generally as cold working. The products thus formed are unusually strong, have high melting points, and for many purposes are sufficiently pliable. For certain uses, however, and particularly for use in the form of films, sheets and the like, greater pliability is sometimes desired.

Because of the marked difference in structure and properties, e. g., solubility and compatibility characteristics, between the polymers with which the present invention is concerned and fiber-forming materials derived from cellulosic derivatives, the plasticizer requirements of these two classes of materials differ very markedly. For these reasons it is impossible to predict whether a given plasticizer for a cellulose derivative will function as a polyamide plasticizer. The fact that polyamides are insoluble in the solvents used for cellulosic materials and are in general soluble only in phenols and formic acid is also a limiting factor in the selection of a plasticizer to be incorporated by the customary solvent procedure. Another factor which must be taken into consideration is that polyamides, unlike cellulosic derivatives, are susceptible to cold drawing and that polyamide filaments, ribbons, and the like are normally cold drawn before they are used. For the preparation of such products the plasticizer must be one which does not interfere with cold drawing.

This invention has as an object the preparation of new compositions useful in making filaments, bristles, ribbons, films, sheets, etc. Another object is to improve the properties, particularly the pliability, of synthetic linear condensation polyamides and of articles derived therefrom.

These and other objects, which will be apparent from the following description, are accomplished by incorporating certain monomeric amides with the polyamides.

The amides used in plasticizing the polyamides in accordance with the practice of this invention boil above 220° C., the sulfonamides, and particularly the N-alkyl aryl sulfonamides, being especially valuable for the present purpose. A very convenient method for incorporating the monomeric amide in the polyamide consists in immersing the polyamide in sheet or ribbon form in a solution of the monomeric amide in a non-solvent for the polyamide. Concentrated solutions of the monomeric amide in alcohol are especially useful. Under these conditions the monomeric amide is absorbed by the polyamide sheet. In many instances selective absorption occurs as evidenced by the fact that the concentration of the monomeric amide within the polyamide can be made to exceed that within the solution. After the desired amount of the monomeric amide has been absorbed by the polyamide, the sheet is removed and dried. The sheet should preferably not be dried at elevated temperatures. In the solid plasticized products of this invention the amount of monomeric amide will generally range from 1% to 40% by weight of the polyamide, the amount used depending upon the nature of the amide and the properties desired in the final product.

The plasticizing effect of the amide is greatly enhanced by the presence within the polyamide sheet of a small amount of water or alcohol. The amount of water which the polyamide sheet absorbs from the air, while only a few percent by weight, is sufficient for this purpose.

Other methods of incorporating the monomeric amide can also be used; for example, the polyamide and monomeric amide can be dissolved in a mutual solvent and the solution used in making filaments, films, and the like either by evaporative or coagulative methods. The lower fatty acids, e. g. formic acids, are useful solvents for this purpose. Phenol can also be used to advantage. In the case of certain polyamides, e. g., interpolyamides, alcohols and mixtures of alcohols and chlorinated hydrocarbons can be used as solvents. Although it is generally not desirable to incorporate amides of carboxylic acids with polyamides at elevated temperatures, e. g. with molten polyamides, the sulfonamides can be incorporated to advantage by this method since they are substantially chemically inert toward the polyamides. The stability of the sulfonamides at elevated temperatures and their non-reactivity toward polyamides makes them particularly useful plasticizers. These properties make it possible to spin, extrude, and otherwise form articles from molten polyamide-sulfonamide compositions without the use of a solvent. It also makes it possible to prepare polyamide-sulfonamide compositions by incorporating the sulfonamide in the reactants from which the polyamide is made. This method of incorporating the sulfonamide is illustrated in subsequent Examples I and V.

The following examples are illustrative of methods for carrying out the invention:

*Example I*

Seven hundred and eighty-six (786) parts of hexamethylene diammonium adipate, 165 parts of a mixture of N-ethyl-o- and p-toluene sulfonamides, and 127 parts of p-tertiary amyl phenol were charged into an autoclave, and the air removed by evacuating the vessel under 2 mm. mercury pressure. The pressure was then restored to atmospheric by introducing oxygen-free nitrogen. The charge was heated at 265°–270° C. for three hours under conditions which permitted the removal of water formed during the reaction. The last traces of moisture were removed by evacuating to 2 mm. mercury pressure for fifteen minutes. The molten mass was then removed from the autoclave by extruding through a narrow slit into cold water. The ribbon thus formed was clear and very pliable, and melted at 235° C. when tested in the open on a copper block. The ribbon was much more pliable and clear than a ribbon similarly prepared from unplasticized polyhexamethylene adipamide. On cold rolling by passing several times between the rolls of an even speed mill, the ribbon became even more pliable and clear. A sample of this ribbon was molded in a poker chip die at 200° C. under 5000 pounds pressure to yield a hard, tough, semi-transparent chip.

*Example II*

A ribbon of polyhexamethylene adipamide was prepared by extruding the molten polymer between rollers immersed in cold water. A sample of this ribbon was immersed in a solution containing 10 parts of N-ethyl-p-toluene sulfonamide and 110 parts of 50% aqueous alcohol, maintained at 70°–75° C. After three hours, the strip was removed from the solution, rinsed twice with 50% aqueous alcohol, and dried to constant weight in a desiccator over calcium chloride. The sample, which showed an increase in weight of 9%, was more pliable than the original. When allowed to remain in air for several hours, the sample absorbed approximately 2% of its weight of moisture. The ribbon containing the sulfonamide and the water was much more pliable than either the unplasticized ribbon or the ribbon containing only the sulfonamide. The tensile strength of the plasticized sample after standing for 48 hours at 50% relative humidity and 25° C. was 7600 lbs. per sq. in. as compared to 9500 lbs. per sq. in. for the original ribbon. On cold rolling 100% by passing several times between the rolls of a hand mill, bringing the rolls closer together after each pass, the tensile strength was increased to 18,800 lbs. per sq. in. as compared to 15,800 lbs. per sq. in. for a similarly rolled sample of the unplasticized ribbon.

*Example III*

A ribbon of polyhexamethylene adipamide was prepared by extruding the molten polymer between rollers immersed in cold water. This ribbon was immersed in a solution composed of 50 parts of hexamethylene diacetamide, 25 parts of ethyl alcohol and 25 parts of water, maintained at 40°–45° C. After 15 hours, the ribbon was removed from the solution, rinsed twice with 50% aqueous alcohol, and dried to constant weight in a desiccator over calcium chloride. The ribbon had absorbed about 8% of its weight of hexamethylene diacetamide. When this ribbon was allowed to remain in contact with the air at room temperature for several hours, approximately 2% of its weight of moisture was absorbed, causing the ribbon to be much more pliable than either the original or the original plus the hexamethylene diacetamide.

*Example IV*

A copolyamide was prepared by heating equimolecular proportions of hexamethylene diammonium adipate and decamethylene diammonium sebacate at 230°–250° C. under conditions which permitted the removal of the water formed during the reaction. Ten (10) parts of this polyamide, 7 parts of diphenylol propane, 3 parts of p-toluene sulfonamide, and 15 parts of n-butyl alcohol were placed in a 250 cc. flask, equipped with a reflux condenser, and heated at 140° C. until complete solution resulted. A portion of this solution was poured onto a glass plate which had been previously heated to about 90° C. By means of a suitable doctor knife the solution was spread to an even layer and then baked for 3 hours at 100° C. to remove the butyl alcohol. The film, after removal from the glass plate by soaking overnight in water, was soft and pliable and had considerable elasticity.

*Example V*

Twelve (12) parts of hexamethylene diammonium adipate and 2.6 parts of N-ethyl-p-toluene sulfonamide were charged into a glass tube, and the tube was thoroughly evacuated and sealed. The tube was heated for 1.75 hours at 220°–235° C. and then opened. The polymerization was completed by heating at 245°–250° C. for one hour under 5 mm. of mercury pressure. In the massive form the mixture of polyhexamethylene adipamide and N-ethyl-p-toluene sulfonamide was a light tan and somewhat brittle solid melting at 240°–245° C., but when molded between lubricated aluminum plates a transparent pliable film resulted.

*Example VI*

One hundred thirty (130) parts of polyhexamethylene adipamide were dissolved in 500 parts of formic acid. By slowly pouring this formic acid solution into 5 liters of water, while the water was vigorously agitated, the polyhexamethylene adipamide was precipitated in a fine granular form. The precipitated polyamide was filtered and washed repeatedly with water to remove the last traces of formic acid, and finally dried at 100° C. Twenty (20) parts of this finely divided polyamide, 2.5 parts of carvacrol, and 7.5 parts of N-ethyl-p-toluene sulfonamide were charged into a ball mill and the mixture milled for 128 hours until a fine dry homogeneous powder resulted. A sample of this powder was molded in a poker chip die at 200° C. under 15,000 pounds pressure. The resulting chip was a tan, opaque solid, which was tough and hard.

*Example VII*

Twenty (20) parts of polyhexamethylene adipamide, having an intrinsic viscosity of 0.9 were fused at 284° C. to form a viscous melt. A slow stream of carbon dioxide was passed over the surface of the melt to exclude air. To the molten mass were added with stirring 8 parts of N-ethyl-p-toluene sulfonamide, to produce a light cream-colored fluid homogeneous melt. Upon cooling the melt set to a tough amber solid melting at 230°–235° C. When molded between aluminum plates at 225° C. a transparent pliable film resulted.

It is to be understood that the aforementioned examples are merely illustrative of the compositions of this invention and their manner of preparation. As examples of additional synthetic linear condensation polyamides which can be plasticized by the addition of monomeric amides may be mentioned polytetramethylene sebacamide, polypentamethylene adipamide, polypentamethylene sebacamide, polyhexamethylene glutaramide, polyhexamethylene sebacamide, polyoctamethylene adipamide, polydecamethylene carbamide, poly-p-xylylene sebacamide, polyphenylene diacetamide, and the polyamide derived from 3,3'-diaminodipropyl ether and adipic acid. Polymerized 6-aminocaproic acid, polymerized 9-aminononanoic acid, and polymerized 11-aminoundecanoic acid are examples of linear condensation polymers derived from amino acids which may also be used. As illustrated in Example IV, copolyamides or interpolyamides can likewise be plasticized by monomeric amides. Obviously, the invention is also applicable to mixtures of polyamides. In general, the synthetic linear condensation polyamides do not exhibit fiber-forming properties unless they have an intrinsic viscosity above 0.4. Likewise, to be useful in making films, ribbons, rods, etc., the polyamides should have an intrinsic viscosity above 0.4, and preferably above 0.6. The expression, intrinsic viscosity, is to be understood in accordance with the definition thereof contained in Carothers U. S. Patent 2,130,948.

Instead of the polyamides mentioned above which are obtainable from bifunctional polyamide-forming reactants as essentially sole reactants, I may use the linear condensation polyamides obtained by including with the polyamide-forming reactants used to prepare the polyamide other bifunctional reactants, such as glycols and hydroxy acids. As examples of such modified polyamides may be mentioned those derived from diamines, dibasic acids, and glycols; those derived from diamines, dibasic acids, and hydroxy acids; those derived from amino acids, dibasic acids, and glycols; and those derived from amino acids and hydroxy acids. Although these products contain ester linkages they can still be referred to as polyamides since they contain a plurality of amide linkages and retain many of the desirable properties of the straight polyamides. Like the straight polyamides, these modified polyamides do not exhibit fiber-forming properties until their intrinsic viscosity is at least 0.4.

As additional examples of monomeric amides which may be used in making the compositions of this invention may be mentioned the following: ethanol formamide, stearamide, lauramide, benzamide, salicylamide, tetrabutyl adipamide, tetrabutyl phthalamide, bis-ethanol adipamide, bis(diethanol)-adipamide, bis-ethanol diglycolamide, acetanilide, N-diphenyl lauramide, acetoacetanilide, diacetyl derivative of ethanol amine, tripropionyl derivative of diethanolamine, p-toluene sulfonamide, N-butyl-p-toluene sulfonamide, mixture of N-butyl-o- and p-toluene sulfonamides, N-diamyl-p-toluene sulfonamide, N-dibutyl-p-toluene sulfonamide, N-benzoyl-p-toluene sulfonamide, cyclohexane sulfonamide, cyclohexane 1,4-disulfonamide, N-isobutyl cyclohexane sulfonamide, N-phenyl cyclohexane sulfonamide, N-(2-ethylhexyl) cyclohexane sulfonamide, N-dimethyl cyclohexane sulfonamide, N-ethyl sulfonamide, N-butyl-benzene sulfonamide, naphthalene sulfonamide, and N-ethyl naphthalene sulfonamide.

This invention is not limited to compositions consisting of polyamide and the plasticizing amide alone. As already indicated, the plasticizing effect of the amide is greatly increased by the presence of a small amount of water or alcohol. Other hydroxylated non-solvents, and particularly alcohols such as methanol, propanol, isobutanol, benzyl alcohol, cyclohexanol, hexamethylene glycol and glycerol, have a similar effect. Moreover, there may be included in the present compositions other types of plasticizers, such as dibutyl phthalate and tricresyl phosphate. Particularly valuable products are obtained by using the plasticizers of this invention in conjunction with phenols, e. g., t-butyl phenol, diamyl phenol, resorcinol, carvacrol, diphenylolpropane, and p-hydroxydiphenyl. The compositions of this invention may also contain other types of modifying agents, e. g., luster modifying materials, pigments, dyes, antioxidants, oils, antiseptics, cellulose derivatives, etc.

The amides of high boiling point used in the practice of this invention not only comply with the requirement mentioned above of not interfering with cold drawing or cold working or with the orientation of the polymer molecules, but also actually improve the working properties, and particularly cold rolling. Furthermore, the increase in pliability caused by the amide is more marked in the cold rolled product than in the unrolled product, and in many instances the cold rolled products containing amide plasticizers are stronger than cold rolled unplasticized products. The addition of the amide causes a lowering in the melting point of the product but does not cause it to soften over a wide range. In the case of the high melting polyamides this lowering of melting point is desirable since it makes it possible to extrude the molten material at lower temperatures. Addition of the monomeric amide does not materially lower the strength of the product and improves its clarity.

The new compositions described herein are useful in many forms and for many purposes. Typical applications are yarns, fabrics, bristles, surgical sutures, rods, tubes, dental floss, films, ribbons, sheets, safety glass interlayers, molded articles, turnery compositions, adhesives, insulation for electrical conductors, impregnating agents, and coating compositions. The greater pliability of the compositions of this invention over unmodified polyamides is particularly advantageous in connection with the use of the product in sheet form, and in molding, especially in injection molding. A further advantage of these compositions over the unmodified polyamides is that they are more readily cold rolled.

As many apparently widely different embodiments of this invention may be made without departing from the spirit and scope thereof, it is to be understood that I do not limit myself to the specific embodiments thereof except as defined in the appended claims:

I claim:

1. A plasticized synthetic linear polyamide containing as a plasticizing agent a monomeric amide which has a boiling point above 220° C., the said polyamide being one which is capable of being drawn into fibers showing by X-ray pattern orientation along the fiber axis.

2. The plasticized polyamide set forth in claim 1 in which said monomeric amide is a sulfonamide.

3. The plasticized polyamide set forth in claim 1 in which said monomeric amide is an N-alkyl aryl sulfonamide.

4. A synthetic linear polyamide plasticized with a mixture comprising a monomeric amide boiling above 220° C. and a hydroxylated non-solvent for the polyamide, the said polyamide being one which is capable of being drawn into fibers showing by X-ray pattern orientation along the fiber axis.

5. The plasticized polyamide set forth in claim 4 in which said hydroxylated non-solvent is water.

6. A synthetic linear polyamide plasticized with a monomeric amide which has a boiling point above 220° C., the said polyamide being one which has an intrinsic viscosity of at least 0.4 and which yields on hydrolysis with hydrochloric acid a mixture comprising a diamine hydrochloride and a dicarboxylic acid.

7. The plasticized polyamide set forth in claim 6 in which the said monomeric amide is a sulfonamide.

8. The plasticized polyamide set forth in claim 6 in which said monomeric amide is a N-alkyl aryl sulfonamide.

9. A plasticized synthetic linear polyamide containing as a plasticizing agent a monomeric amide which has a boiling point above 220° C., the said polyamide being one which has an intrinsic viscosity of at least 0.4.

10. The plasticized polyamide set forth in claim 9 in which said monomeric amide is a sulfonamide.

11. The plasticized polyamide set forth in claim 9 in which said monomeric amide is an N-alkyl aryl sulfonamide.

DONALD D. COFFMAN.